(12) United States Patent
Fifield

(10) Patent No.: US 6,744,752 B1
(45) Date of Patent: Jun. 1, 2004

(54) RADIO LOCAL AREA NETWORK

(75) Inventor: Robert Fifield, Redhill (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 655 days.

(21) Appl. No.: 09/666,400

(22) Filed: Sep. 20, 2000

(30) Foreign Application Priority Data

Oct. 5, 1999 (GB) .............................................. 9923512

(51) Int. Cl.[7] ................................................. H04Q 1/00
(52) U.S. Cl. ........................ 370/338; 455/69; 455/517
(58) Field of Search ................................. 370/338, 400; 455/69, 517, 522; 710/113

(56) References Cited

U.S. PATENT DOCUMENTS

| 5,481,680 A | * | 1/1996 | Larson et al. | 710/113 |
| 5,551,066 A | * | 8/1996 | Stillman et al. | 455/69 |
| 6,073,199 A | * | 6/2000 | Cohen et al. | 710/113 |
| 6,504,834 B1 | * | 1/2003 | Fifield | 370/345 |
| 2001/0012275 A1 | * | 8/2001 | Caldwell et al. | 370/252 |

* cited by examiner

Primary Examiner—Brian Zimmerman

(57) ABSTRACT

A radio local area network(LAN) comprises a plurality of plug and play operating devices(OD1 to OD4), such as TV, STB, VCR and PC, one of which devices functions as a central controller(CC) which sets up time division digital data links between the operating devices in response to activating a suitable man/machine interface, for example an infra-red TV remote controller(RC). Those of the operating devices capable of operating as a central controller have stores(32) for storing power-on data so that in the event of the current central controller becoming de-energised an arbitration process is invoked whereby the operating device having the best power-on history becomes the new central controller.

In a refinement, the arbitration process may be invoked when an operating device joins the radio LAN but in order to deter too many changes in central controllers the history of the current central controller is weighted.

11 Claims, 1 Drawing Sheet

RADIO LOCAL AREA NETWORK

The present invention relates to a radio local area network (LAN), particularly but not exclusively, a high data rate (12 to 54 Mb/s) radio LAN with a transmission range of up to 50 meters, for example HIPERLAN2 (High Performance Radio Local Area Network).

A radio local area network of a type to which the present invention relates comprises in a domestic environment a plurality of what is termed plug and play operating devices, such as televisions (TVs), video cassette recorders (VCRs), digital set top boxes, personal computers (PCs), wireless games, high quality audio equipment and security/monitoring devices. Typically all the operating devices operate in accordance with a time division protocol and a single radio carrier. Adjacent radio LANs operate on different radio carriers. However as the radio LANs are short range, frequency re-use can be practised in a manner similar to cellular telephone systems. Control of the radio LAN is effected by a master capable operating device acting as a central controller which allocates resource, that is down-and up-link time slots in a sequence of time frames, for a data transaction between two operating devices, for example a TV and VCR, in the radio LAN. The allocation of the resource depends on the operating devices and how much capacity they require. Since the master capable operating device can itself be switch-on and -off at random times by a user, there is a need for the radio LAN to be able to select another master capable operating device as a central controller from amongst those devices which are currently energised. However each change of central controller involves re-organising the radio LAN which is undesirable.

An object of the present invention is to enable a radio LAN to be able to select a central controller from amongst the currently energised master capable operating devices.

Another object of the present invention is to reduce the number of changes of central controller.

According to one aspect of the present invention there is provided a radio local area network comprising a plurality of wireless plug and play operating devices, one of which operating devices functions as a master device for setting-up wireless links between the operating devices, at least two of said operating devices having means for building-up a history of when the respective ones of said at least two operating devices are energised, wherein when the current master device is rendered inoperative as a master device, one of said at least two of said operating devices having the more (or most) favourable history functions as a master device.

According to a second aspect of the present invention there is provided a method of operating a radio local area network comprising a plurality of wireless plug and play operating devices, the method comprising one of said plurality of operating devices functioning as a master device for setting-up wireless links between the operating devices, at least two of said operating devices building-up a history of when the respective ones of said at least two operating devices are energised, and one of said at least two of said operating devices having a more favourable history taking-over the function of the master device in response to the current master device being rendered inoperative.

According to a third aspect of the present invention there is provided a plug and play operating device comprising means for building up a history of when it is energised.

In one embodiment of the present invention, the total on-time of each master capable operating device over a preset time period is determined and is used in selecting the next central controller.

In another embodiment of the present invention the number of times a master capable operating device is switched-on over a preset time period is determined and the inverse of the number is used in selecting the next central controller.

In a further embodiment the total on-time and the number of times that the operating device is switched-on over a preset time period are used to select the next master capable operating device to be the central controller. Preference is given to the operating device which has a total on-time composed of a smaller number of on-time periods rather than an operating device whose total on-time is composed of a larger number of on-time periods which would require frequent re-organisation of the radio LAN.

In an attempt to reduce the number of re-organisations of the radio LAN, the arbitration process used may permit a re-assessment of the selection of the master operating device in the event of another operating device being energised and joining the radio LAN, however insodoing there is a bias made in favour of the central controller function remaining with the presently selected master operating device.

The present invention will now be described, by way of example, with reference to the accompanying drawings, wherein.

In the drawings the same reference numerals have been used to indicate the same features.

Figure 1:
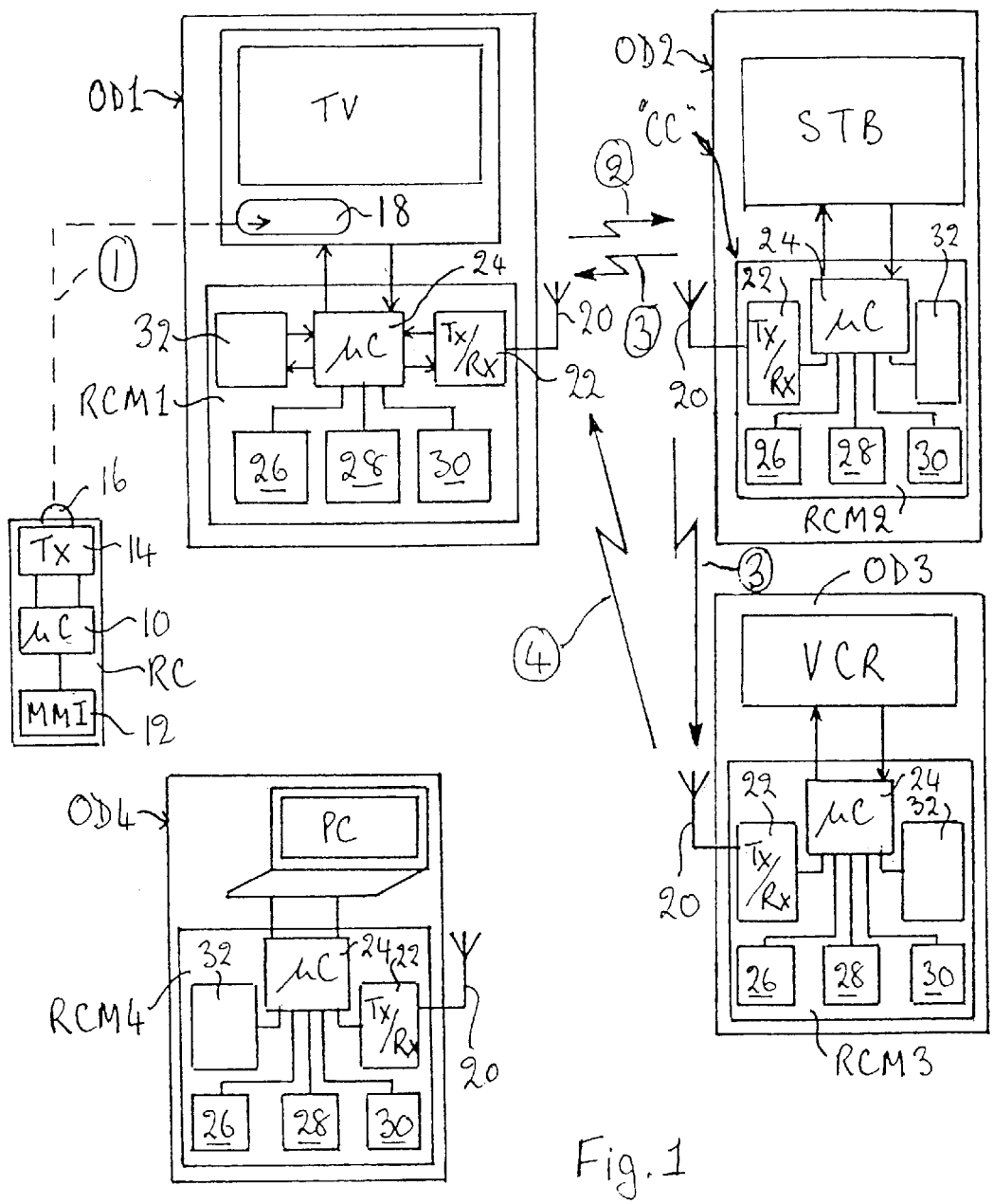
FIG. 1 is a block schematic diagram of a radio LAN.

The radio LAN shown in FIG. 1 comprises a number of operating devices OD1, OD2, OD3 and OD4 and an infrared remote controller RC. For convenience of illustration the operating devices OD1 to OD4 respectively comprise a TV set having an infra-red receiver 18, a set top box STB, a video cassette recorder VCR and a battery powered lap top personal computer PC. The operating devices OD1 to OD4 further comprise a radio control module RCM1 to RCM4, respectively, which enable the operating devices to be members of the radio LAN.

The remote controller RC comprises a microcontroller 10, a keypad 12 constituting a man/machine interface coupled to the microcontroller 10 and an infra-red transmitter 14 coupled to the microcontroller 10 and to an infra-red emitting device 16.

Each of the radio control modules RCM1 to RCM4 is substantially identical and in the interests of brevity only radio control module RCM1 will be described in detail. An antenna (or other radio signal propagation means) 20 is coupled to a radio transceiver 22. A microcontroller 24 has inputs/outputs coupled to a clock 26, a device 28 for sensing the lengths of the time periods when power is (or is not) being supplied to the TV, a device 30 for sensing the number of times power is switched-on (or -off) and a store 32 for storing the duration that power has been supplied and the total number of times that power has been switched-on (or -off).

The transmission of digital data signals between pairs of the operating devices OD1 to OD4 is by a single frequency, time division protocol.

Figure 2:
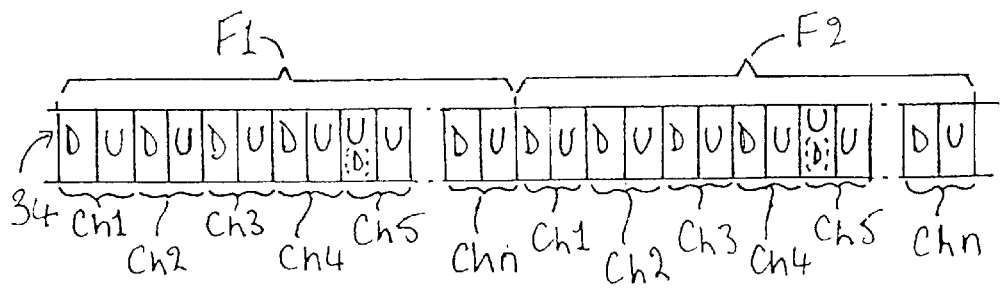
FIG. 2 is an example of a single frequency time division protocol.

FIG. 2 illustrates an example where the radio carrier 34 is divided in the time domain into a succession of frames F1, F2 and so on. Each frame F1, F2 is divided into time slots, otherwise termed a physical channel, and pairs of time slots nominally allocated one for transmission on a down link D and the other for transmission on an uplink U are termed a duplex voice pair Ch1, Ch2 . . . Chn. Thus two way communication between different pairs of operating devices OD1 to OD4 can be effected in successive frame periods. If the data carrying capacity of a physical channel is equal to, or less than, the amount data to be carried then a central controller CC, to be discussed later, allocates one duplex voice pair, say Ch1, to the transaction. In the event that one of the operating devices transmits data at a rate in excess of the capacity of one physical channel, then 2 duplex voice pairs, say Ch1, Ch2, are allocated to the transaction. In the event of the transaction being asymmetrical with a large quantity of data being transmitted on say the uplink U and only a small amount of data being transmitted on say the downlink D, the central controller CC may allocate say 2 channels, for example Ch4, Ch5, and arrange for what would be the downlink physical channel of Ch5 to temporarily be an uplink physical channel for the duration of the data transaction.

In operation, it will be assumed that the radio control module RCM2 is functioning as the central controller CC. If a user with the remote controller RC wants the TV set to be operatively connected to the VCR, he selects VCR on the remote controller RC and an infra-red signal "1" is sent by the transmitter 14 and emitting device 16 to the infra-red receiver 18 where it is converted to an electrical signal and relayed to the microcontroller 24 of the module RCM1. This module transmits a request link signal "2" to the central controller CC. The central controller checks to see what spare channels are available and what data carrying capacity is required and transmits link establishing signals "3" to both the operating devices OD1 and OD3. The radio control modules RCM1 and RCM3 establish a data exchange link "4" between them thus enabling the video and sound data from the VCR to be reproduced on the TV set.

For flexibility in operation, the radio LAN does not have a separate central controller but at least some of radio control modules of the operating devices OD1 to OD4 are capable of acting as a central controller CC. For convenience of reference these operating devices are called master capable operating devices. The selection of a particular one of the master capable operating devices to be the next central controller is achieved by arbitration. If the operating device which includes the central controller is switched off, the radio LAN can be affected, therefore the arbitration procedure should take into account that the master capable operating device selected should not be one which is turned-off regularly and ideally should be a device which is continuously on. Thus looking at the radio LAN shown in FIG. 1, the lap top computer PC would under normal circumstances would not be the best choice for functioning as the central controller because they are often used for a short period and then powered down. In contrast the set top box STB or VCR would be a better choice because ideally they are left switched on.

Prior art operating devices do not measure and store information as to how long they are energised and when and how long they are switched on and off. In implementing the radio LAN made in accordance with the present invention the operating devices include devices 28 and 30 for sensing when power is being supplied and for sensing the number of times the device switches on or off. As a consequence the arbitration process for selecting a central controller CC can take into account either one or both of the parameters being monitored by the devices 28, 30 which will provide a "power-on" history of the operating device. The power-on history which is stored in the store 32 of the radio control module RCM could include the times during the day/week when the device is switched-on, the total on-time since power on, and the frequency with which an operating device is switched-on and -off or derivatives of the above. The power-on history may be of any suitable form such as a single bit of information which indicates that the device has been on continuously for a week or as complex as an exact record of device usage over a week/month and the ability to predict device usage in the future based on building-up a history of past usage, for examples TV viewing habits.

In FIG. 1 the method of recording the power-on history is for an operating device to be equipped with a sensor or device 28 which detects when the power supply is falling. On detection of this event the total on-time (TotalOnTime) as determined by the device 28 and/or current time as measured by the clock 26 are retained in the static memory 32. Additionally the number of times an operating device is switched-on could be sensed by the device 30 and retained in the memory (SwitchOnCount). When power is resumed the time at which the operating device is powered-on is written into a subsequent memory location of the static memory 32 and the on-time counter 28 would be reset and begin to increment once again.

In a simplified form of measuring and recording the power-on history is for the radio control module RCM of an operating device to have an incrementing counter which is started when the operating device is switched-on and stopped when the device is switched-off. The count in the counter is then stored in the memory 32.

In the arbitration process, besides the power-on history, it is useful to take into account the radio location parameters, that is, how many operating devices (or nodes) the central controller is communicating with and the signal strengths.

Using the "power history" parameters "TotalOnTime" and "SwitchOnCount", the power history of an operating device could be quantified from worst case to best case because ideally a central controller should be on for a long time and should be switched on/off as few times as possible. The table below shows possible limits for these parameters.

The next step is to produce a single score of how good the power history of an operating device is, this could be done using equation 1 which weights the switch-on count asymptotically. The score for the worst and best case is also shown in the following table.

$$PowerHistoryScore = TotalOnTime + \frac{2 \times 168}{1 + SwitchOnCount} \quad \text{Equation 1}$$

|  | WORST | BEST |
|---|---|---|
| Total on time during past week | 0 hours | 168 hours (max) |
| Switch On count during past week | 168 (max) | 0 |
| Power History Score | 2 | 504 |

This PowerHistoryScore can be combined with radio location parameters and sent out to the current central controller CC, during CC arbitration in order to help decide which of the operating devices should be the next central controller CC. If a device is known to be a poor choice for the CC (e.g. a laptop) then the PowerHistoryScore could be set to zero.

In the typical scenario for domestic premises shown in FIG. 1, all the operating devices OD1 to OD4 have the capability to be central controllers. These devices are a laptop computer PC, a television TV, a video cassette recorder VCR and set top box STB. In this scenario CC arbitration is based purely on power history parameters.

The STB is currently the CC, however a power cut occurs and the STB, TV and VCR switch off. The laptop automatically goes into the CC arbitration process and sends out its PowerHistoryScore. It receives no other PowerHistoryScore and presumes the role of the CC.

After power resumes the STB, TV and VCR rejoin the radio LAN and the CC arbitration process is therefore invoked. Each of the devices have the following "power history" parameters:

|  | Laptop | TV | VCR | STB |
|---|---|---|---|---|
| On duration since power up | 2 hours | 30 hours | 80 hours | 168 |
| Total on time during past week | 12 hours | 160 hours | 80 hours | 168 |
| Switch On count during past week | 20 | 3 | 1 | 1 |
| PowerHistory Score | 28 | 244 | 248 | 336 |

Each device sends out its score to the CC. The CC compares all of the PowerHistoryScores and weights its own score by a extra positive factor, for example multiplying its score by a factor of two (this is because it is undesirable to change the CC often in case of a disruption to services). The STB is chosen as the new CC because it has the highest score.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of radio LANs and component parts therefor and which may be used instead of or in addition to features already described herein.

What is claimed is:

1. A radio local area network comprising a plurality of wireless plug and play operating devices, one of which operating devices functions as a master device having a central controller (CC) function for setting-up wireless links between the operating devices, at least two of said operating devices each having means for determining and providing a central controller (CC) function, wherein the at least two wireless plug and play operating devices build-up a history of when the respective ones of said at least two operating devices are energised, so that when the current master device is rendered inoperative as a master device, one of said at least two of said operating devices having the more (or most) favourable history functions becomes a master device by an arbitration process and performs the CC function.

2. A radio local area network as claimed in claim 1, characterised in that said one of said at least two operating devices is selected as a function of its total on-time.

3. A radio local area network as claimed in claim 1, characterised in that said one of said at least two operating devices is selected as an inverse function of the number of times that the said operating device has been switched-on.

4. A radio local area network as claimed in claim 1, characterised in that said one of said at least two operating devices is selected on the basis of a power history-on score $P_{PHS}$ defined by:

$$P_{PHS} = TotalOnTime + \frac{2 \times 168}{1 + SwitchOnCount}$$

where "TotalOnTime" is the total time that the operating device is energised in a predetermined period and "SwitchOnCount" in the number of times that the operating device is switched-on during the said predetermined period.

5. A radio local area network as claimed in claim 4, characterised in that in response to another of the operating devices being energised the current master device re-evaluates its entitlement to continue as the master device and insodoing favourably biases its score to reduce the likelihood of changing its status.

6. A method of operating a radio local area network comprising a plurality of wireless plug and play operating devices, the method comprising one of said plurality of operating devices functioning as a master device having a central controller (CC) function for setting-up wireless links between the operating devices, at least two of said operating devices building-up a history of when the respective ones of said at least two operating devices are energised, and each of said at least two operating devices being adapted for determining a central controller (CC) and providing a central controller function, wherein one of said at least two of said operating devices having a more favourable history takingover the function of the master device in response to the current master device being rendered inoperative.

7. A method as claimed in claim 6, characterised in that that history is a power history-on score $P_{PHS}$ defined by:

$$P_{PHS} = TotalOnTime + \frac{2 \times 168}{1 + SwitchOnCount}$$

where "TotalOnTime" is the total time that the operating device is energised in a predetermined period and "SwitchOnCount" in the number of times that the operating device is switched-on during the said predetermined period.

8. A plug and play operating device comprising means for building up a history of when it is energised and for determining a most favourable device to perform the CC controller functions, wherein said plug and play operating device includes a means for functioning as a central controller.

9. A device as claimed in claim 8, characterised in that said means comprises means for computing a power history-on score $P_{PHS}$ defined by:

$$P_{PHS} = TotalOnTime + \frac{2 \times 168}{1 + SwitchOnCount}$$

where "TotalOnTime" is the total time that the operating device is energised in a predetermined period and "SwitchOnCount" in the number of times that the operating device is switched-on during the said predetermined period.

10. A radio local area network as claimed in claim 1, wherein if only one device of the at least two operating devices is functioning after the current master device is rendered inoperative as a master device, said one device presumes the role of the master device and performs the central controller functions until at least a second of the at least two operating devices is functioning, wherein the arbitration process includes determining which device is best-suited to be the master device while factoring in disruption to the radio local area network if said one device does not have the most favorable history.

11. A method as claimed in claim 6, wherein if only one device of the at least two operating devices is functioning after the current master device is rendered inoperative as a master device, said one device presuming the role of the master device and performing the central controller functions until at least a second of the at least two operating devices is functioning, wherein the arbitration process includes determining which device is best-suited to be the master device while factoring in disruption to the radio local area network if said one device does not have the most favorable history.

* * * * *